(12) United States Patent
Meijer et al.

(10) Patent No.: US 9,746,912 B2
(45) Date of Patent: Aug. 29, 2017

(54) TRANSFORMATIONS FOR VIRTUAL GUEST REPRESENTATION

(75) Inventors: Henricus Johannes Maria Meijer, Mercer Island, WA (US); William H. Gates, III, Medina, WA (US); Gary W. Flake, Bellevue, WA (US); Thomas F. Bergstraesser, Kirkland, WA (US); Arnold N. Blinn, Hunts Point, WA (US); Christopher W. Brumme, Mercer Island, WA (US); Lili Cheng, Bellevue, WA (US); Michael Connolly, Seattle, WA (US); Daniel S. Glasser, Mercer Island, WA (US); Alexander G. Gounares, Kirkland, WA (US); James R. Larus, Mercer Island, WA (US); Matthew B. MacLaurin, Woodinville, WA (US); Debi P. Mishra, Bellevue, WA (US); Amit Mital, Kirkland, WA (US); Ira L. Snyder, Jr., Bellevue, WA (US); Melora Zaner-Godsey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2393 days.

(21) Appl. No.: 11/613,790

(22) Filed: Dec. 20, 2006

(65) Prior Publication Data
US 2008/0082311 A1 Apr. 3, 2008

Related U.S. Application Data

(63) Continuation-in-part of application No. 11/536,449, filed on Sep. 28, 2006, now Pat. No. 8,012,023.

(51) Int. Cl.
*A63F 9/24* (2006.01)
*G06F 3/01* (2006.01)

(52) U.S. Cl.
CPC .................................. *G06F 3/011* (2013.01)

(58) Field of Classification Search
CPC ...................................... A63F 13/212
(Continued)

(56) References Cited

U.S. PATENT DOCUMENTS 5,263,165 A 11/1993 Janis
5,495,576 A 2/1996 Ritchey
(Continued)

FOREIGN PATENT DOCUMENTS

EP 0915595 5/1999
EP 1058429 12/2000
(Continued)

OTHER PUBLICATIONS

"Battlefield 2". From Wikipedia, The Free Encylopedia. [online], [retrieved on Mar. 18, 2016]. Retrieved from the Internet <URL:http://en.wikipedia.org/wiki/Battlefield_2>. 10 pages.*
(Continued)

*Primary Examiner* — Lawrence Galka
(74) *Attorney, Agent, or Firm* — Lee & Hayes, PLLC

(57) ABSTRACT

Systems and methods that provide for a virtual reality entertainment system that supplies immersive entertainment and creates a sensation for a user similar to having guests in a remote location to be physically present as virtual guests. Such virtual reality entertainment system can supply a graphic and/or audio; wherein interconnected computers, video and audio processing devices, supply a live interaction between a user and a guest(s). Although guests are only present virtually (e.g., electronically present with other objects/user within the environment) such virtual invitation enables a user and guests to concurrently experience the entertainment together (e.g., a live sporting event, spectator game). In a related aspect, the subject innovation can
(Continued)

US 9,746,912 B2

Page 2 implement holographic avatars, and a plurality of communication interfaces, to imitate (and/or transform) a relationship between the user and the virtual guests/surrounding environment.

20 Claims, 14 Drawing Sheets

(58) Field of Classification Search
USPC .................................................. 703/24
See application file for complete search history.

(56) References Cited

U.S. PATENT DOCUMENTS

| | | | |
|---|---|---|---|
| 5,537,404 A | 7/1996 | Bentley et al. | |
| 5,588,914 A | 12/1996 | Adamczyk | |
| 5,774,668 A | 6/1998 | Choquier et al. | |
| 5,850,352 A | 12/1998 | Moezzi et al. | |
| 5,859,972 A | 1/1999 | Subramaniam et al. | |
| 5,926,179 A | 7/1999 | Matsuda et al. | |
| 6,040,841 A | 3/2000 | Cohen et al. | |
| 6,064,656 A | 5/2000 | Angal et al. | |
| 6,128,004 A | 10/2000 | McDowall et al. | |
| 6,139,432 A * | 10/2000 | Watanabe et al. | 463/31 |
| 6,185,567 B1 | 2/2001 | Ratnaraj et al. | |
| 6,195,683 B1 | 2/2001 | Palmer et al. | |
| 6,209,039 B1 | 3/2001 | Albright et al. | |
| 6,226,260 B1 | 5/2001 | McDysan | |
| 6,325,717 B1 | 12/2001 | Kawagoe et al. | |
| 6,341,127 B1 | 1/2002 | Katsube et al. | |
| 6,352,479 B1 | 3/2002 | Sparks, II | |
| 6,409,599 B1 | 6/2002 | Sprout et al. | |
| 6,415,288 B1 | 7/2002 | Gebauer | |
| 6,434,532 B2 | 8/2002 | Goldband et al. | |
| 6,469,991 B1 | 10/2002 | Chuah | |
| 6,496,482 B1 | 12/2002 | Kubota | |
| 6,620,043 B1 | 9/2003 | Haseltine et al. | |
| 6,707,820 B1 | 3/2004 | Arndt et al. | |
| 6,745,224 B1 | 6/2004 | D'Souza et al. | |
| 6,755,743 B1 | 6/2004 | Yamashita et al. | |
| 6,917,975 B2 | 7/2005 | Griffin et al. | |
| 6,961,318 B2 | 11/2005 | Fichou et al. | |
| 6,999,083 B2 | 2/2006 | Wong et al. | |
| 7,002,926 B1 | 2/2006 | Eneboe et al. | |
| 7,020,654 B1 | 3/2006 | Najmi | |
| 7,065,041 B2 | 6/2006 | Sen | |
| 7,148,895 B2 | 12/2006 | Konishi et al. | |
| 7,373,377 B2 | 5/2008 | Altieri | |
| 2002/0124053 A1 | 9/2002 | Adams et al. | |
| 2002/0143277 A1* | 10/2002 | Wood et al. | 600/595 |
| 2002/0183115 A1 | 12/2002 | Takahashi et al. | |
| 2003/0038805 A1 | 2/2003 | Wong et al. | |
| 2003/0105734 A1 | 6/2003 | Hitchen et al. | |
| 2003/0220143 A1 | 11/2003 | Shteyn et al. | |
| 2003/0229623 A1 | 12/2003 | Chang et al. | |
| 2004/0049537 A1 | 3/2004 | Titmuss | |
| 2004/0076160 A1 | 4/2004 | Phaltankar | |
| 2004/0098456 A1 | 5/2004 | Krzyzanowski et al. | |
| 2004/0171381 A1 | 9/2004 | Inselberg | |
| 2004/0193441 A1 | 9/2004 | Altieri | |
| 2005/0033669 A1 | 2/2005 | Stremler et al. | |
| 2005/0138419 A1 | 6/2005 | Gupta et al. | |
| 2005/0238024 A1 | 10/2005 | Taylor et al. | |
| 2005/0262132 A1 | 11/2005 | Morita et al. | |
| 2005/0289234 A1 | 12/2005 | Dai et al. | |
| 2006/0020700 A1 | 1/2006 | Qiu et al. | |
| 2006/0031518 A1 | 2/2006 | Jennings, III | |
| 2006/0036904 A1 | 2/2006 | Yang | |
| 2006/0041606 A1 | 2/2006 | Sawdon | |
| 2006/0048224 A1 | 3/2006 | Duncan et al. | |
| 2006/0058103 A1 | 3/2006 | Danieli et al. | |
| 2006/0062161 A1 | 3/2006 | Tang et al. | |
| 2006/0123005 A1 | 6/2006 | Burnett et al. | |
| 2007/0021199 A1* | 1/2007 | Ahdoot | 463/30 |
| 2007/0050715 A1* | 3/2007 | Behar | 715/706 |
| 2007/0115123 A1 | 5/2007 | Roberts et al. | |
| 2007/0136572 A1 | 6/2007 | Chen et al. | |
| 2007/0222746 A1* | 9/2007 | LeVine | 345/156 |
| 2008/0125226 A1 | 5/2008 | Emmerson | |

FOREIGN PATENT DOCUMENTS

| | | |
|---|---|---|
| EP | 1524580 | 4/2005 |
| GB | 2409417 A | 6/2005 |
| JP | 2001282634 | 12/2004 |
| KR | 1020040038271 | 5/2004 |
| KR | 1020040107152 | 12/2004 |
| KR | 1020060057563 | 5/2006 |
| WO | WO9846029 | 10/1998 |
| WO | WO0008814 | 2/2000 |
| WO | WO0175545 | 10/2001 |
| WO | WO04002107 | 12/2003 |
| WO | 2005022826 | 3/2005 |
| WO | WO2005022826 | 3/2005 |

OTHER PUBLICATIONS

"Battlefield 2 Sniper", [dated Aug. 9, 2006]. [online], [retrieved Mar. 25, 2016]. Retrieved from the Internet <URL:https://www.youtube.com/watch?v=X464mhq3MKE>. 1 page.*

"Battlefield 2 Walkthrough", [dated Jun. 21, 2005], From gamespot.com. [online], [retrieved Mar. 25, 2016]. Retrieved from the Internet <URL:http://www.gamespot.com/articles/battlefield-2-walk-through/1100-6127838/> 25 pages.*

"Quake (video game)". From Wikipedia, The Free Encylopedia. [online], [retrieved on Mar. 26, 2016]. Retrieved from the Internet <URL:https://en.wikipedia.org/wiki/Quake_(video_game)>. 10 pages.*

"Thresh's Quake Bible: The Ring of Shadows—Invisibility". From quaketerminus.com vie The Way Back Machine (www.archive.org). [online], [retrieved on Mar. 26, 2016], Retrieved from the Internet: <URL:http://web.archive.org/web/20060821133433/http://www.quaketerminus.com/quakebible/art-ring.htm>. 3 pages.*

"Battlefield 2". From Wikipedia, The Free Encyclopedia. [online], [retrieved on Dec. 13, 2016]. Retrieved from the Internet <URL:https://en.wikipedia.org/w/index.php?title=Battlefield_2&oldid=78157928>. 11 pages.*

"Quake (video game)". From Wikipedia, The Free Encyclopedia. [online], [retrieved on Dec. 13, 2016]. Retrieved from the Internet <URL:https://en.wikipedia.org/w/index.php?title=Quake_(video_game)&oldid=78181301>. 14 pages.*

Brightwell, et al. Reserving Resilient Capacity in a Network: (2003) Networks 41, No. 2, 20 pages.

Brunner, et al "Disruption Tolerant Networking" Dagstuhl Seminar Proceedings (2005) NEC Europe Ltd., Network Laboratories, 4 pages.

Callaham, "Valve's Multicast Tech Interview", retrieved on Mar. 7, 2006 at <<https://mail.internet2.edu/wws/arc/wg-multi-cast/2001-04/msg00015.html>> Apr. 13, 2001 3 pages.

Cederquist, et al. An Audit Logic for Accountability. 2005. http://www.citebase.org/fulltext?format=application/pdf&identifier;oai:arXiv.org:cs/0502091. Last Acessed Sep. 20, 2006.

Cheruki, et al. "Building Edge-Failure Resilient Networks" (2002) Lucent Bell Labs, 18 pages.

Cohen, "The Virtual Cinematographer: A Paradigm for Automatic Real-Time Camera Control and Directing", retrieved May 2, 2006 at <<http://research.microsoft.com/research/pubs/view.aspx?pubid=145>>, 1 page.

Create Buzz Marketing & Word of Mouth Marketing Campaigns. 2004-2005 Buzznoodle, A Liquid Learning Inc. Company.

Drucker, "Intelligent Camera Control for Graphical Environments", MIT Media Lab, Apr. 29, 1994, 207 pages.

Duffield, et al. "A Flexible Model for Resource Management in Virtual Private Networks" (1999) ACM SIGCOMM Computer Communication Review vol. 29, Issue 4, 14 pages.

Fox, et al. "Towards Flexible Messaging for SOAP Based Services" (2004) IEEE, 11 pages.

(56) References Cited

OTHER PUBLICATIONS

"GameSpy—Multicast Spectator Tech for Half-Life", retrieved on Mar. 7, 2006 at <<http://archive.gamespy.com/articles/june01/hlmod3b/>>, 4 pages.
Gibstats—Welcome, retrieved Mar. 7, 2006 at <<http://gibstats/planetquake.gamespy.com/index.html>>, 1 page.
Seth godin, Unleashing the Ideaivirus, Do You Zoom, Inc., 2000.
Gundez, et al. "A Framework for Aggregating Network Performance in Distributed Brokering Systems" (2000) Department of Electrical Engineering & Computer Science, Syracuse University, 11 pages.
Hota, et al. "Restoration of Virtual Private Networks with QoS Guarantees in the Pipe Model" (2004) GESTS International Transaction on computer Schience and Engineering, vol. 6 and No. 1, Journal ISSN No. 1738-6438, 12 pages.
Hughes, et al. Automated Verification of Access Control Policies, Computer Science Department, UC Santa Barbara.
International Search Report for PCT Application No. US 2007/079598, dated Jan. 30, 2008, 10 pages.
International Search Report for PCT Application No. US 2007/079598, dated Nov. 18, 2008, 13 pages.
Otten, "Broadcasting Virtual Games in the Internet", Jun. 2001, 11 pages.
"Pervasive Gaming Goes Mainstream", retrieved on May 22, 2006 at <<http://marketresearch.com/product/display.asp?productid=275>>, 3 pages.
Sandu, et al. Access Control: Principles and Practice. IEEE Communications Magazine, Sep. 1994.
Surowiecki, et al. "The Wisdom of Crowds" Doubleday, 2004.
System Management Concepts: Operating System and Devices. 2006.
"Valve's Multicast Tech Interview", retrieved on May 2, 2006 at <<http://www.ukterrorist.com/news/317/>>, 2 pages.
Vronay, et al., "Streaming Media Interfaces for Chat", Virtual World Group, Microsoft Research, 7 pages.

Brunner, et al. "Disruption Tolerant Networking" Dagstuhl Seminar Proceedings (2005) NEC Europe Ltd., Network Labooratories, 4 pages.
Gunduz, et al. "A Framework for Aggregating Network Performance in Distributed Brokering Systems" (2000) Deptartment of Electrical Engineering & Computer Science, Syracuse University, 11 pages.
Chekuri, et al. "Building Edge-Failure Resilient Networks" (2002) Lucent Bell Labs, 18 pages.
Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.
Brightwell, et al. "Reserving Resilient Capacity in a Network" (2003) Networks 41, No. 2, 20 pages.
Duffield, et al. "A Flexible Model for Resource Management in Virtual Private Networks" (1999) ACM SIGCOMM Computer Communication Review vol. 29 , Issue 4, 14 pages.
Create Buzz Marketing & Word of Mouth Marketing Campaigns. 2004-2005 Buzzoodle, A Liquid Learning Inc. Company. http://www.buzzoodle.com. Last accessed Sep. 20, 2006.
Seth Godin. Unleashing the Ideavirus. Do You Zoom, Inc., 2000.
James Surowiecki. The Wisdom of Crowds. Doubleday, 2004.
Sandhu, et al. Access Control: Principles and Practice. IEEE Communications Magazine, Sep. 1994.
System Management Concepts: Operating System and Devices, http://www.dlib.indiana.edu/doc_link/en_US/a_doc_lib/aixbman/admnconc/audit.htm. Last accessed Sep. 20, 2006.
Hughes, et al. Automated Verification of Access Control Policies. http://www.cs.ucsb.edu/~bultan/publications/tech-report04.pdf. Last accessed Sep. 20, 2006.
Cederquist, et al. An Audit Logic for Accountability. 2005. http://www.citebase.org/fulltext?format=application/pdf &identifier=oai:arXiv.org:cs/0502091. Last accessed Sep. 20, 2006.

* cited by examiner

TRANSFORMATIONS FOR VIRTUAL GUEST REPRESENTATION

CROSS REFERENCE TO RELATED APPLICATION

This application is a continuation-in-part of U.S. application Ser. No. 11/536,449 filed on 28 Sep. 2006, entitled "VIRTUAL ENTERTAINMENT"—the entirety of which is incorporated herein by reference.

BACKGROUND

Advancement of technology in the world of communications and computing has significantly advanced entertainment systems and enhanced user experiences. In general, entertainment systems strive to realistically recast an environment in which an event or game action occurs. Such trend can also involve recreating the environment based on a user's expectations or desires. Moreover, recent advancements in processing power and transmission capability have made it possible to recreate a realistic setting in relatively small computer enabled systems.

Typically, the entertainment industry offers a variety of passive and interactive forms of settings for amusements, which often are tailored depending on target audience. For example, different video games and television events or programs are specifically marketed to specific life styles, target age groups, and the like. Similarly, head mounted computer displays enable users to experience a graphical environment, wherein a user can enjoy an illusion of presence in the displayed environment. In general, such software for generating virtual reality environments have typically been employed for training and entertaining of personnel, wherein relatively inexpensive computing devices enable 3D virtual reality user interfaces. These 3D virtual reality worlds allow a user to explore a simulated environment. Such environments can further include views from an ordinary street scene with walkways, roads, and buildings to a completely fictitious landscape of an outer space planet. In general, the end goal with virtual reality interfaces still remains to provide the user the most realistic experience possible.

Moreover, there exists a tendency for computer games to emulate television programs, and there often is significant crossover between video games and television. For example, some computer video games are based on television programs, and other computer games subsequently become the subject of television programs or full-length feature movies. Despite similarities, there is little interaction between the video games and associated television programs. Typically, a user is either a participant of the video game, or a passive viewer of a television program or movie.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for systems and methods that supply immersive entertainment, and create a sensation for a user(s) that is similar to having guests (who are in remote locations), to be presented as virtual guests to the user during performance of an event (e.g. a live sporting event, spectator game, television shows, games and the like)—via employing a presentation system and a virtual reality generation component. Such virtual reality generation component emulates activities of virtual guests (e.g., implement holographic avatars via a plurality of communication interfaces to imitate actions of virtual guests, and/or accepts functions provided to transform the activities, and the like). The presentation system can present such activities to the user, (e.g., activities of the virtual guest can be viewed, heard, felt, or otherwise presented to the senses of the user.) In addition, transform functions for activities can be supplied dynamically (e.g., based on type of virtual events)—for example transformation functions applied to virtual guests enable creation of a variety of scenarios (e.g., change of avatar representation, appearance of the virtual guest and the like.)

Although guests are only present virtually (e.g., electronically present with other objects/user within the environment), the user and guests can concurrently experience the event together—such that the user can feel actual presence of guests in the same environment (e.g., full duplex communication while experiencing the event, visual prompts exchange with virtual guest, shared emotions, other data exchange and the like.) For example, guests who have accepted the virtual invitation from remote locations can control their virtual presence thru avatars that represent them, e.g. through a combination of input mechanisms, such as: hand held input devices. Moreover, such guests can wear a tracking system of body motion, to control their virtual presence thru avatars that represent them, (e.g. data generated from electronic and electromagnetic tracking components can monitor bodily movement, and transfer such movements to a respective avatar and/or holographic virtual representation). Accordingly, the subject innovation supplies a platform to include a set of experiences, which are supplemented with continuous capturing of data and images (e.g., live video, continuous motion), to encompass information about the event/virtual guests, and to further allow such information to be accessible to a user on demand.

Additionally, users can also customize the entertainment or interaction with virtual guests by selection of a viewing angle, speed, re-plays and the like. A background isolation component can operate in conjunction with the entertainment system, to filter unwanted distractions. Accordingly, a dynamic multi-way communication channel can be established among the guests, users, and the event/show itself. Moreover, the interaction of the guests and users with each other can also determine manner of presentation for the show, e.g., close up scenes to be emphasized, censured, and the like.

Another aspect of the subject innovation provides for an infrastructure or portal (e.g., a Website) to access spectator related services. The portal can supply information about the occurrence of one or more live sporting games, live concerts, shows that are capable of viewing by the users and guests or other events. For example, the portal can include a user interface, which presents information about available event occurrences, to a user. The user can then decide to enjoy such event with virtual guests. The available events can correspond to real time or to delayed versions of the events, and can include visual and/or audio information about the available event occurrences; such as: identifying the name for each event, the number of active participants, the number of spectators, and the like. The portal can further include user interface elements that can be activated to connect to a spectator experience corresponding to a desired occurrence of a game or event.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
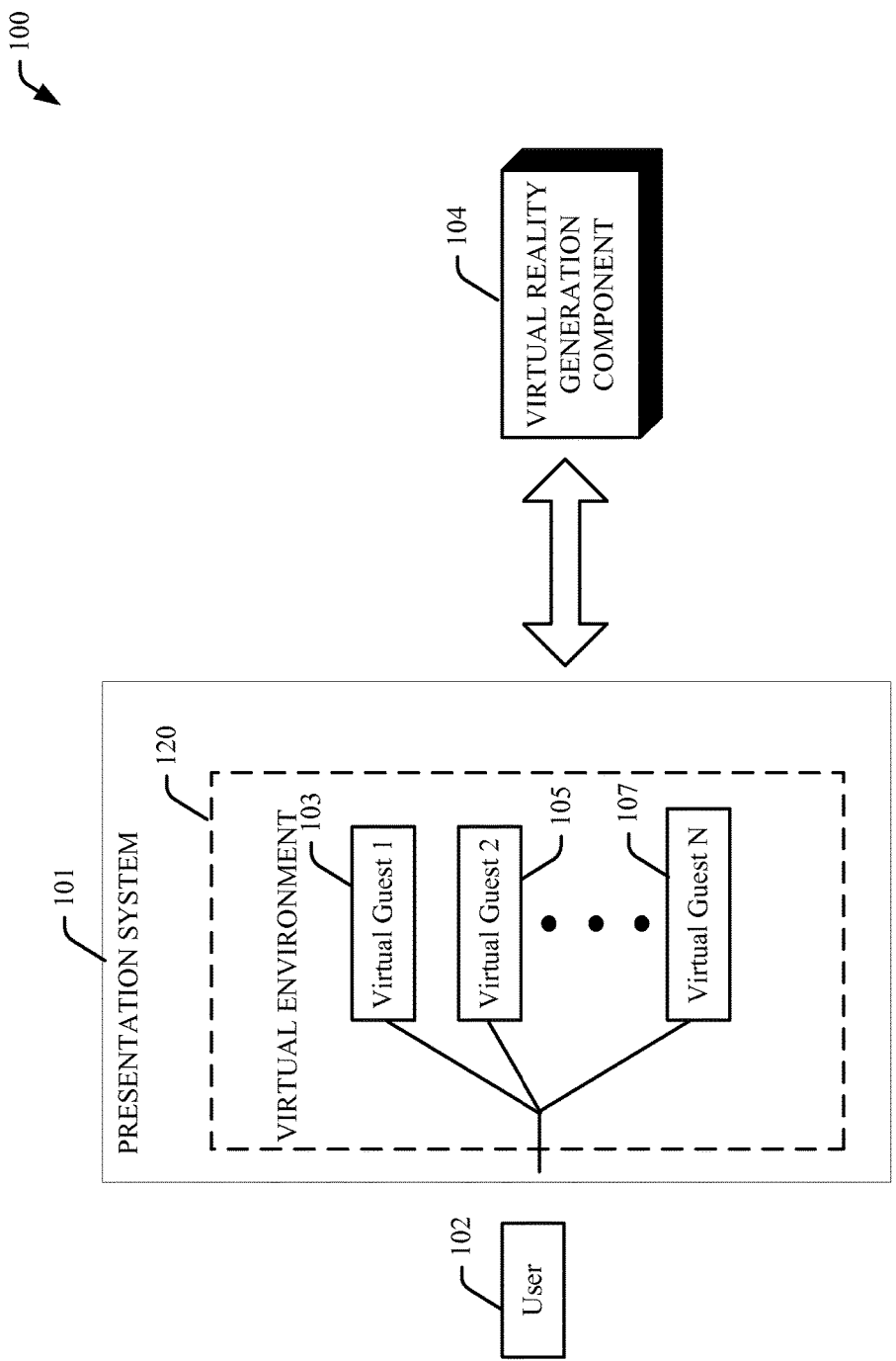
FIG. 1 illustrates a block diagram of an exemplary system that enables a user to create a sensation similar to having guests in a remote location to be physically present as virtual guests.

FIG. 1 illustrates a system 100 for a virtual reality entertainment system that supplies immersive entertainment, and creates a sensation for a user similar to having guests—which are actually in a remote location—to be physically present as virtual guests, via employing a presentation system 101 and a virtual reality generation component 104. Such virtual reality component 104 emulates activities of virtual guests (e.g., implement holographic avatars via a plurality of communication interfaces to imitate actions of virtual guests, accept functions to transform the activities), and the presentation system 101 can present such activities to the user, (e.g., activities of the virtual guest can be viewed, heard, felt, smelled or otherwise presented to the senses of the user.) Moreover, the presentation system 101 can employ a personal computer, a projection unit, a system including 3D goggles and headphones, or a simulator providing visual, audible, and physical stimulation, and the like, to present activities of the virtual guest to the user. Accordingly, the presentation system 101 can process information and output data, such that it can be viewed, heard, felt, or otherwise presented to the senses of the user. For example, through the presentation system 101, the user 102 is able to experience presence of virtual guests 103, 105 and 107(1 thru N, N being an integer). It is to be appreciated that the virtual environment 120 itself can also be considered part of the virtual representation system 101. Moreover, interaction of the user 102 with virtual guests can be in form of audio, video, text messaging, holographic avatar and the like. Furthermore, transformation functions can be applied (e.g., dynamically and based on type of virtual events), to enable creation of a variety of scenarios (e.g., change of avatar representation, appearance and the like.) For instance, in the case of a sports game event that has a plurality of virtual guest—who are represented by avatars to represent a stadium setting—transform functions can be applied to represent some virtual guests who are fans as tiny wisps to one user, and yet render such virtual guests as dragons to another user. It is to be appreciated that the system 100 and the subject innovation can further encompass a direct connection to the user's brain (e.g., without employing an intermediate component such as a goggle.)

Moreover, the virtual reality component can implement holographic avatars, via a plurality of communication interfaces, to imitate a relationship between the user and the virtual guests/surrounding environment. Guests who have accepted the virtual invitation, and hence represented as virtual guests 103, 105, and 107 can control their virtual presence thru avatars that represent them, from remote locations; e.g. through a combination of input mechanisms, such as for example: hand held input devices and data generated from electronic and electromagnetic tracking devices that monitor bodily movement, as described in detail infra. Although virtual guests 103, 105, and 107 are only present virtually (e.g., electronically present with other objects/user within the environment), such virtual invitation enables a user and guests to concurrently experience the entertainment together (e.g., exchange of emotions during a live sporting event or spectator game; visual prompts exchange with virtual guest, other data exchange and the like.)

Figure 2:
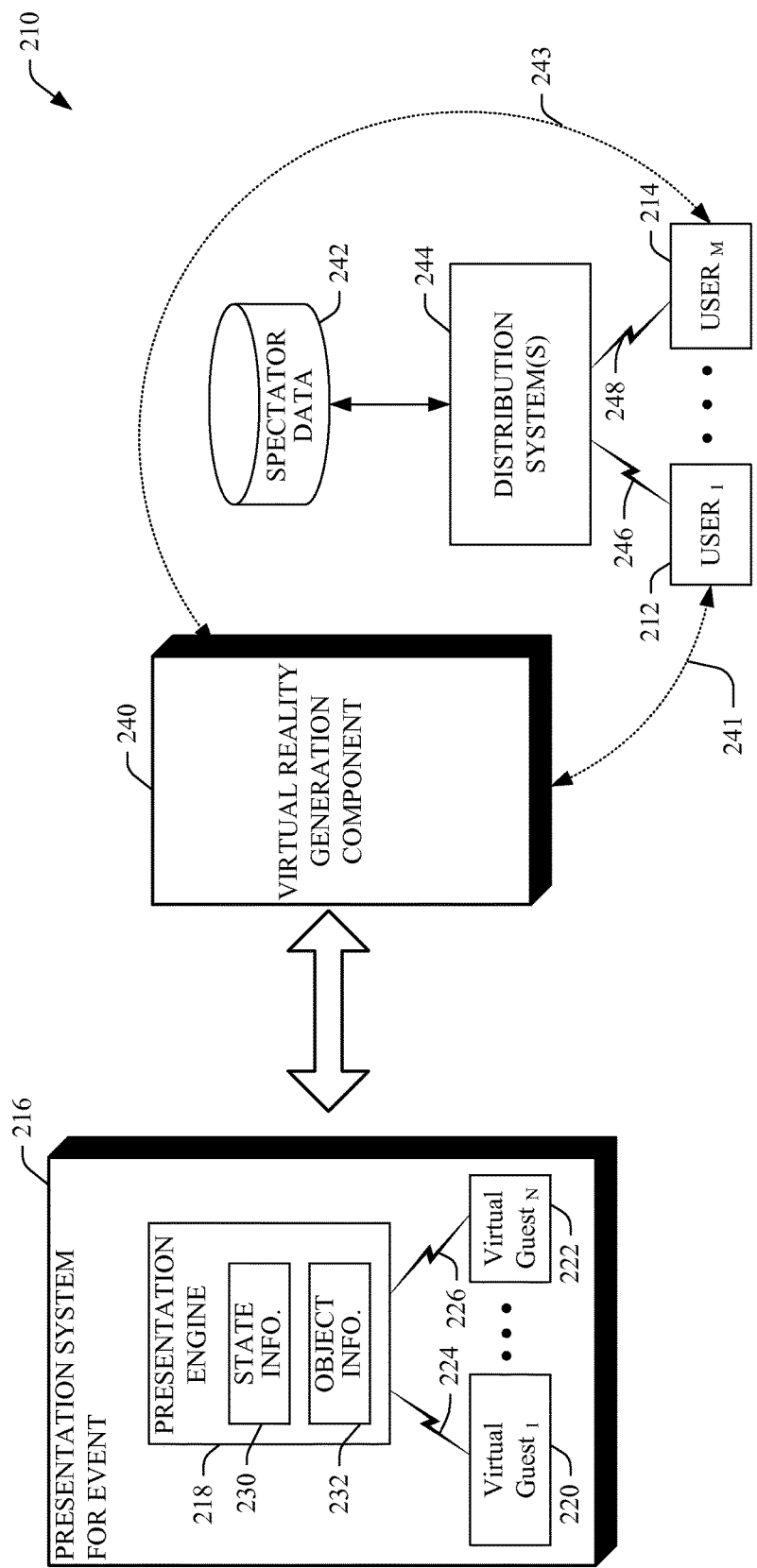
FIG. 2 illustrates a block diagram for a system with a virtual reality generation component in accordance with an aspect of the subject innovation.

FIG. 2 illustrates a block diagram of a system 200 that creates a sensation for a user(s) similar to having guests in a remote location to be physically present as virtual guests, and vice versa (e.g., an asymmetrical relation can exist between users and guests). The system 210 provides a spectator experience to one or more users 212, 214 (User₁ through User_M, where M is an integer) in accordance with an aspect of the subject innovation. The system 210 can operate in conjunction with an occurrence of an event (e.g., a sporting game), to be enjoyed by a plurality of users in presence of a plurality of virtual guests 220 to 222 (1 thru N, where N is an integer). It is to be appreciated that the subject innovation can be employed in conjunction with television shows, news, broadcasts, computer games, group meetings, and the like. In addition, the presentation system for event 216 can include a live, real time occurrence and/or can be based on stored data for a previous occurrence thereof. Moreover, the presentation system for event 216 can further include a presentation engine 218, with which one or more users 220 and 222 (being live persons) can interact with virtual guests 220, 222 (1 thru N, N being an integer).

According to a further aspect of the subject innovation, the presentation engine 218 can be implemented as a process running at one or more computers programmed to facilitate interaction between users 212 and 214 and virtual guests 220 and 222 during the presentation system event 216. The virtual guests 220 and 222 can be coupled to the presentation engine 218 through respective communication links 224 and 226. Such links 224, 226 can be direct or indirect connections, such as through one or more proxy servers. A virtual guest 220, 222 can provide instructions to the presentation engine 218 regarding manner of interaction with the users 212, 214 during the event.

Such instructions affect overall experience of the users 212, 214 with the virtual guests 220, 222 and also other attributes of experiencing the event, e.g. ranking comments from virtual guests based on predetermined thresholds, re-play of scenes from the event based on demographics of virtual guests (who is a fan of which team), viewing angles, and the like. The presentation engine 218 can include one or more interfaces that expose methods and/or functions associated with the event to be experienced simultaneously by the users and virtual guests. Such interfaces enable users 212, 214 and virtual guests 220, 222 to communicate therebetween, e.g. by a corresponding process running on the virtual reality generation component 240 that facilitates communication of data between the virtual guests 220, 222 and the users 212, 214.

According to a particular aspect of the subject innovation, the presentation engine 218 can include state information 230 and object information 232, wherein the state information 230 can relate to parameters with values that define status and relationship of the users 212, 214 and virtual guests 220, 222 relative to an event that is shared and/or experienced therebetween. For example, state information 230 can pertain to which users and virtual guest admire a same player or share a common game strategy about a playing event. Such state information 230 can continually update as a function of time, in response to instructions received (and/or the absence of instructions) from the users 212, 214 and/or virtual guests, 220, 222. The state information 230 can further encompass a time stamp to facilitate synchronization of event data for respective users 212, 214 and virtual guests 220, 222. The state information 230, can further include event time, position or condition of the virtual guests 220 and 222 (e.g., who is fan of which team), historical or biographical information, and the like.

Likewise, the object information 232 can provide information about interaction of virtual guests 220, 222 with users 212, 214 and the event. The object data can identify the nature of communication (e.g., message exchange, holographic presentation, audio, desired manner of interacting within the users or event, and the like). The object information 232 and/or the state information 230 can be transceived with each virtual guest 220, 222 to facilitate rendering an animated representation thereof with each user 212, 214. Corresponding information can also be generated for each user 221, 214 based on the state information 230 and object information 232 and data provided by such users (e.g. who is a fan of which team, blockage of some virtual guests, and the like.)

The virtual reality generation component 240 can include a process running on one or more computers (e.g., a server) that operatively communicates with the presentation system 218, for example. Moreover, the virtual reality generation component 240 can receive information indicative of the occurrence of an event, based on which it can generate spectator data 242, such as type of representation for virtual gusts to the user 212, 214. In particular, one or more distribution systems 244 can employ the spectator data to, in turn, distribute (or broadcast) a corresponding signal to the users 212, 214. The users 212, 214 can interact with the virtual reality generation component 240, and receive the distributed spectator information from associated distribution system 244, via communication links 241, 243, 246 and 248 respectively. Such communications links can be direct connections, such as wired (e.g., optical or electrically conductive) or wireless connections, or indirect connections through one or more proxies, and unidirectional or bi-directional communications channel, for example.

Figure 3:
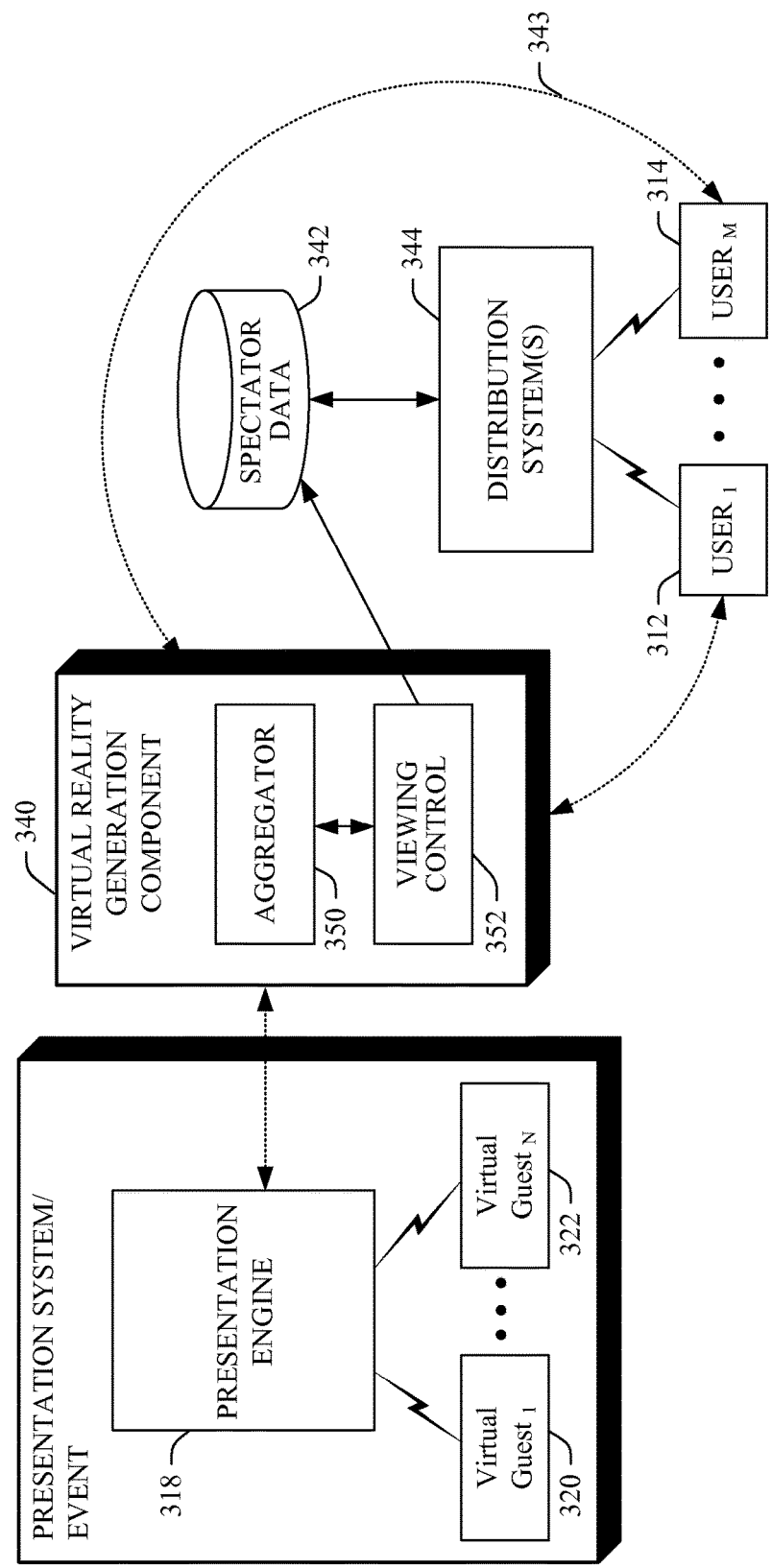
FIG. 3 illustrates a generation component with an aggregator that receives the state information and object information from a presentation engine in accordance with an aspect of the subject innovation.

In a related aspect and as illustrated in FIG. 3, the virtual reality generation component 340 can include an aggregator 350 that receives the state information and object information from the presentation engine 318. As discussed supra, the state information and object information can collectively indicate who the virtual guests are, condition of the event and users, and other attributes associated with occurrence of the event, whereby the virtual reality generation component 340 can subsequently provide the spectator data 342, based on state information, object information and other preferences as indicated by the users and/or virtual guests.

A viewing control component 352 can be coupled to the aggregator 350 to receive aggregated state and object data. The viewing control 352 can process the aggregated data to provide enhanced spectator data, related to interaction of the virtual guests and/or users (e.g. simulate presence of the guest in an environment of the user during performance of the event.) In a related aspect, the viewing control 352 can implement virtual camera control in which a plurality of virtual cameras are utilized to provide cinematic features, such as for example to provide users with desirable viewing angles of virtual guests and/or events. For example, a virtual cameral control can automatically select virtual cameras based on preprogrammed cinematographic algorithms, or manually based on instructions from an authorized person or user (e.g., a human director).

In addition, users 312, 314 can employ virtual camera control to select a desired viewpoint to observe occurrence of the event and/or interaction with virtual guests. For example, a user can select to move between different virtual guests, to couple the virtual camera with one or more participants of the event, or implement an automatic camera control based on designated spectator preferences. The virtual camera of the viewing control 352 also can be coupled with a guest, such as to follow that guest's activities during the event. The viewing control 352 further can dampen motion/interaction of the virtual guests in the representation provided to the spectators 312 and 314.

The virtual reality generation component 340 also can provide a representation of interaction of virtual guests 320, 322 with the spectator data 342; for example, presenting an indication (e.g. audio and/or visual) of virtual guests interaction with the event, such as applauding, cheering and the like. Moreover, virtual guest can be associated with each other, e.g., through a messaging service to enable communication between such virtual guests, (aside from connection with the users during the event.) Accordingly, the users can "feel" presence of the virtual guest during the event (e.g., have side conversations, observe reaction through visual holographs, and the like.) Hence, both the users and the virtual guests can implement features that cause such virtual guests/users to be aware of each other.

It is to be appreciated that numerous possible architectures exist, wherein the system 310 can be implemented in accordance with various aspects of the subject innovation. For example, such architecture and implementation therein can be driven by bandwidth considerations associated with the communication links by which the users 312, 314 interact with virtual guests 320 and 322 to receive and/or transmit information. By way of illustration, in a high bandwidth environment, the entire spectator experience including graphical and/or audio elements can be rendered from the spectator data 342 and then be transmitted over the distribution system(s) 344 to the users 312 and 314. In other circumstances, partial rendering (e.g., for interaction of users) can occur at the virtual reality generation component 340 (e.g., and prior to transmission from the distribution system 344). Likewise, in low bandwidth environments, it can be desirable to store most of the logic and graphical elements operative to generate the interaction environment at the side of users 312 and 314 (e.g., in CD ROM, DVD, hard disk drive, and the like), such that appropriate graphical and/or audio data can be accessed from such stored data to more rapidly create the spectator experience based on the spectator data. The users 312, 314 and guests represented by virtual guests 320, 322 can further employ consoles, such as are operative to connect to the Internet or other communication frameworks. As explained earlier, the system 310 can include televisions that receive the spectator experience as conventional broadcast data (e.g., broadband cable, digital cable, satellite, streaming, and the like). It is to be appreciated that the system 310 can employ more that one communications infrastructure to communicate data that creates the spectator experience, and users can control type of sense(s) to be engaged (e.g., selecting audio interaction with virtual guests, while not choosing scent of virtual guest during such interaction). Moreover, virtual partitions can be provided, which restrict access to some users and not others (e.g., private interaction rooms, chat rooms, and the like.)

Figure 4:
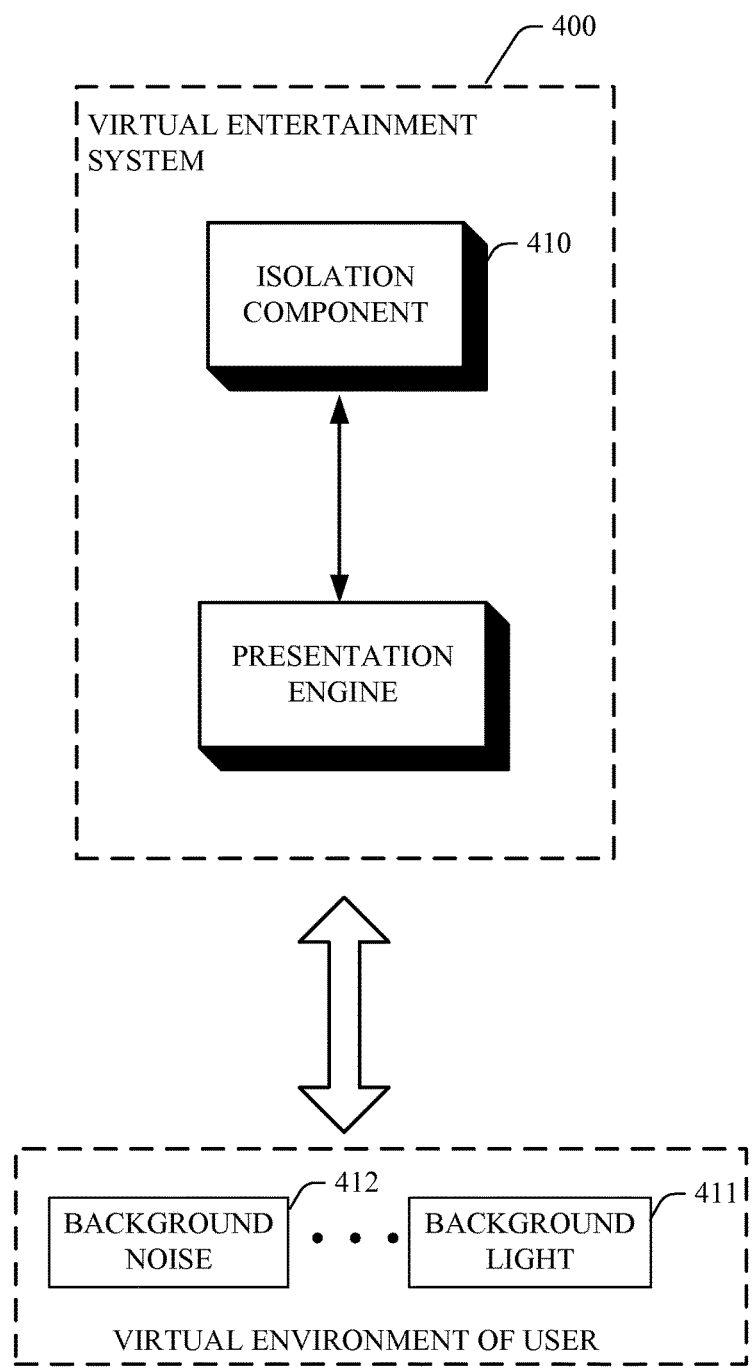
FIG. 4 illustrates a particular aspect of the subject innovation, wherein the virtual entertainment system employs an isolation component.

FIG. 4 illustrates a particular aspect, wherein the virtual entertainment system 400 of the subject innovation, employs an isolation component 410. Such isolation component operates in conjunction with the entertainment system, to filter unwanted background distractions (e.g., 411, 412) at the user's environment. For example, a noise filter can be implemented as part of the isolation component to filter out unwanted background noise. Additionally, users can also customize the entertainment/performance by selection of a viewing angle, speed, re-plays and the like. Accordingly, a dynamic multi-way communication channel can be established among the guests, users, and the show itself. Moreover, the interaction of the guests and users with each other can also determine manner of presentation for the show type, e.g., close up scenes to be emphasized, censured, and the like.

Figure 5:
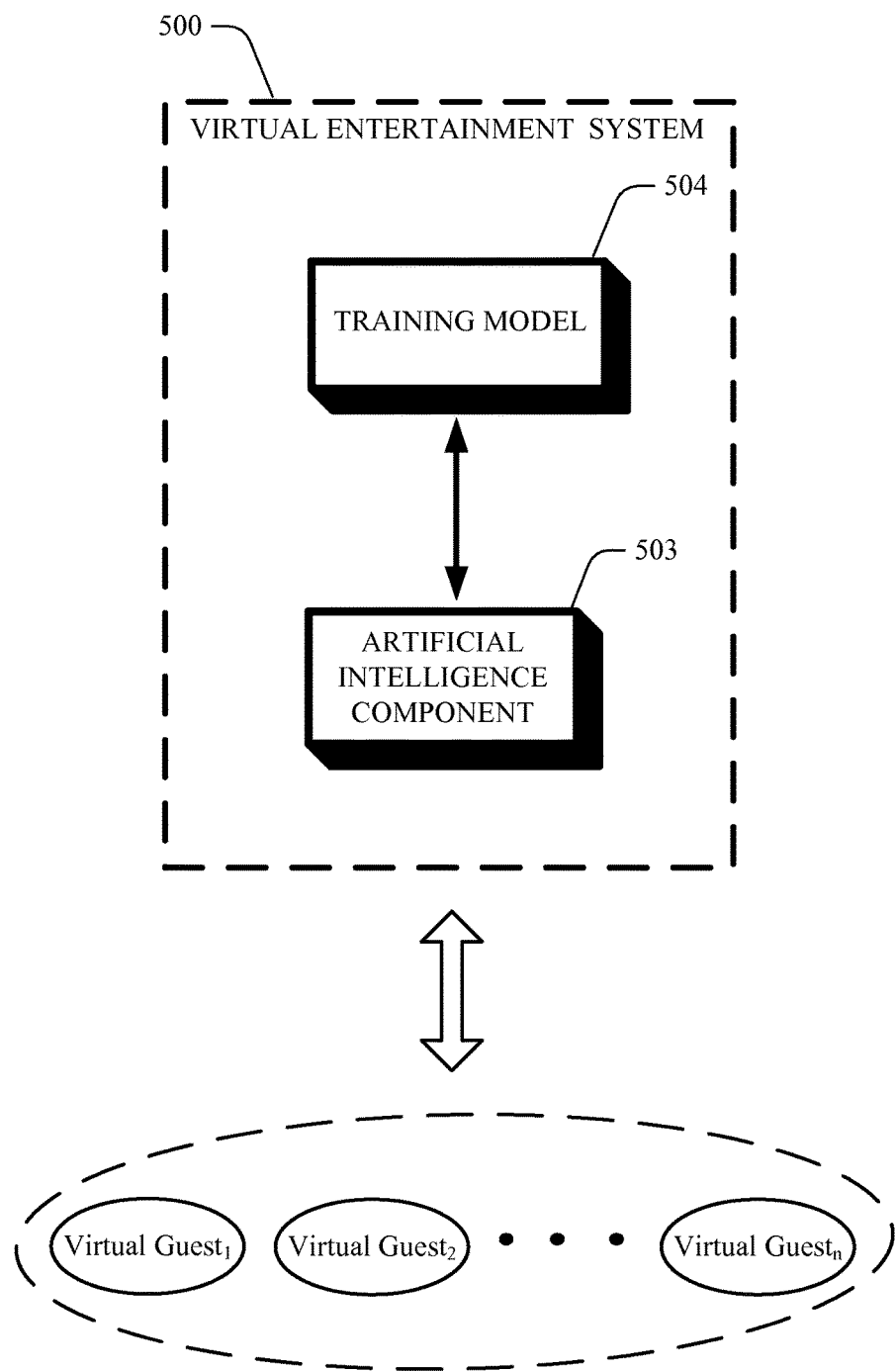
FIG. 5 illustrates a virtual entertainment system that incorporates an artificial intelligence component, in accordance with an aspect of the subject innovation.

FIG. 5 illustrates a virtual entertainment system 500 that incorporates an artificial intelligence component 503 in conjunction with a training model 504, in accordance with an aspect of the subject innovation. For example, a process for enhancing experiences between a user and virtual guests can be facilitated (e.g., supplementation of data images, connection between users and virtual guests) via an automatic classifier system and process. A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g. via a generic training data model 504) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., prior event interactions between virtual guest and users), and at what type of event to implement tighter criteria controls (e.g., live sporting event versus a pre-recorded television show).

Artificial intelligence based systems (e.g. explicitly and/or implicitly training model 504) can be employed in connection with performing inference and/or probabilistic determinations and/or statistical-based determinations as in accordance with one or more aspects of the systems and methods as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject systems and methods.

Figure 6:
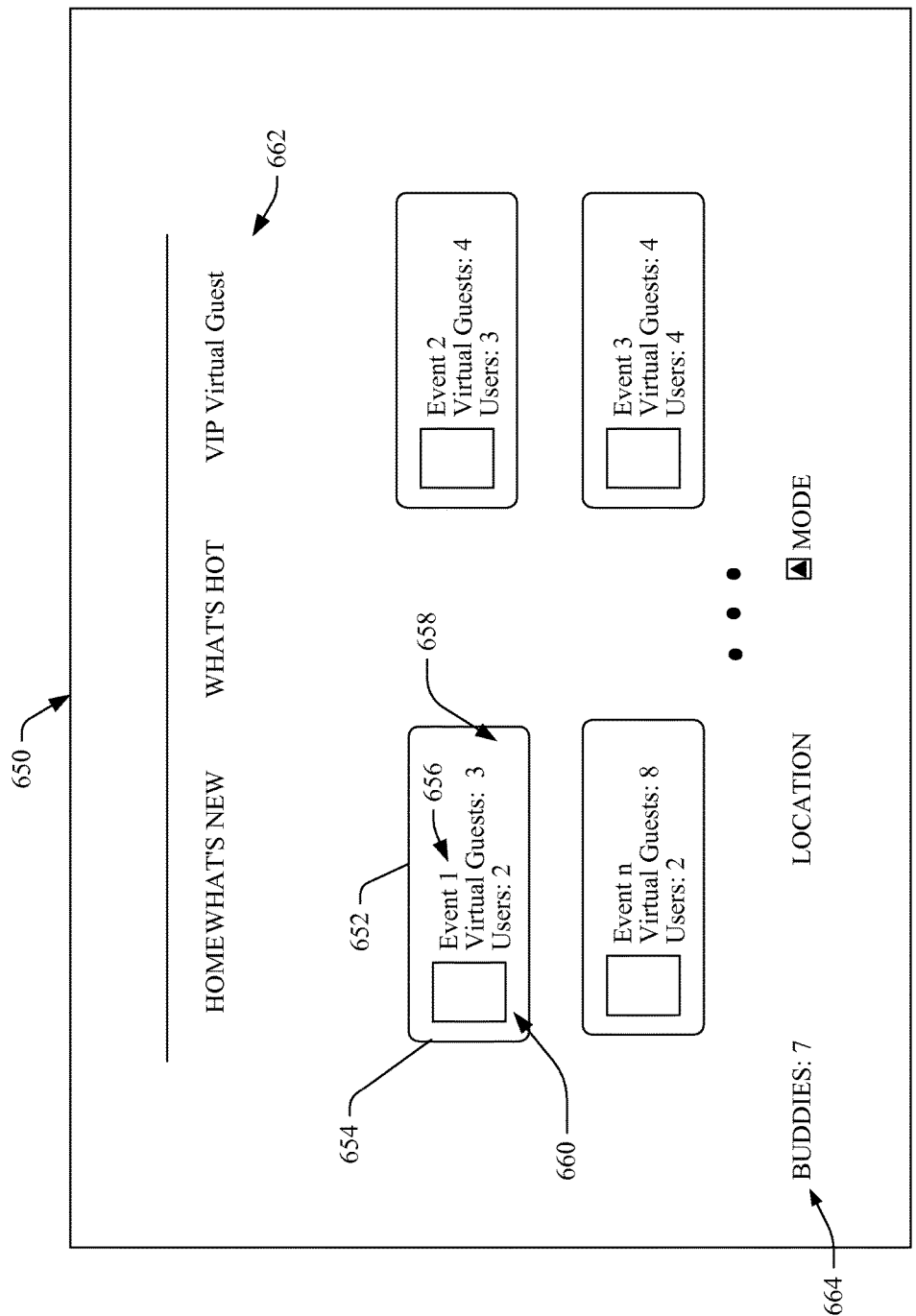
FIG. 6 illustrates an example of a graphical user interface for a portal in accordance with an aspect of the subject innovation.

Referring to FIG. 6, an example of a graphical user interface 650 for a portal is illustrated, in accordance with an aspect of the subject innovation. As mentioned, the portal may be implemented at a Website that collects information from and spectator experiences associated with the event. The interface 650 can include a plurality of user interface elements 652, each associated with a different event. That is, more than one occurrence of an event can exist concurrently. For example, each user interface element 652 can present a variety of information about occurrence of the associated event, including an image 654 for the event that is to be enjoyed by the user and virtual guests, the name of the event 656, the number of virtual guests 658, and the number of users that require interaction with virtual guests. Each item related to such information further can be implemented as a user interface element, which, upon being activated, presents additional related information. For example, by selecting the image element 654, highlights of the current event can be presented to the virtual guest/user, such as by streaming or other communication protocols. The virtual guest interface element 658 can be activated to provide information about the users/virtual guests, such as player statistics, highlights for such players from the present and/or previous events, and the like The interface 650 also can include user interface elements or links to other related websites and/or services. By way of example, the interface can include selectable buttons or links, generally indicated at 662, which include: a link to the service provides homepage (HOME); an interactive of list of new events and/or games for which new spectator services are available (WHAT'S NEW); an interactive list of events such as television shows that have a substantially large group of audiences such as based on various ratings provided by critics and/or number of virtual guests that have indicated interest in participating in events (WHAT'S HOT); and an interactive list for VIP virtual guests as indicated by a user—(VIP virtual guest). The interactive list of guests, for example, can provide links to Web pages that contain more detailed information about each virtual guest, such as statistical information, biographical information, fan clubs and the like.

The illustrated interface 650 can also include a BUDDIES user interface element 664 that provides information indicative of additional users and/or other user preferred virtual guests logged on as spectators that are linked or associated with the user of the interface, such as by identifying characteristics shared between two or more users (e.g. through an instant messaging service). The BUDDIES interface element 664, for example, is a button or link that accesses another Web page or service operative to provide additional information about the user's associates and/or virtual guests. Such information can include a representation of the associate (e.g., graphical and/or textual) as well as each associate's location, namely, an indication of which game(s) the associate is a spectator.

Figure 7:
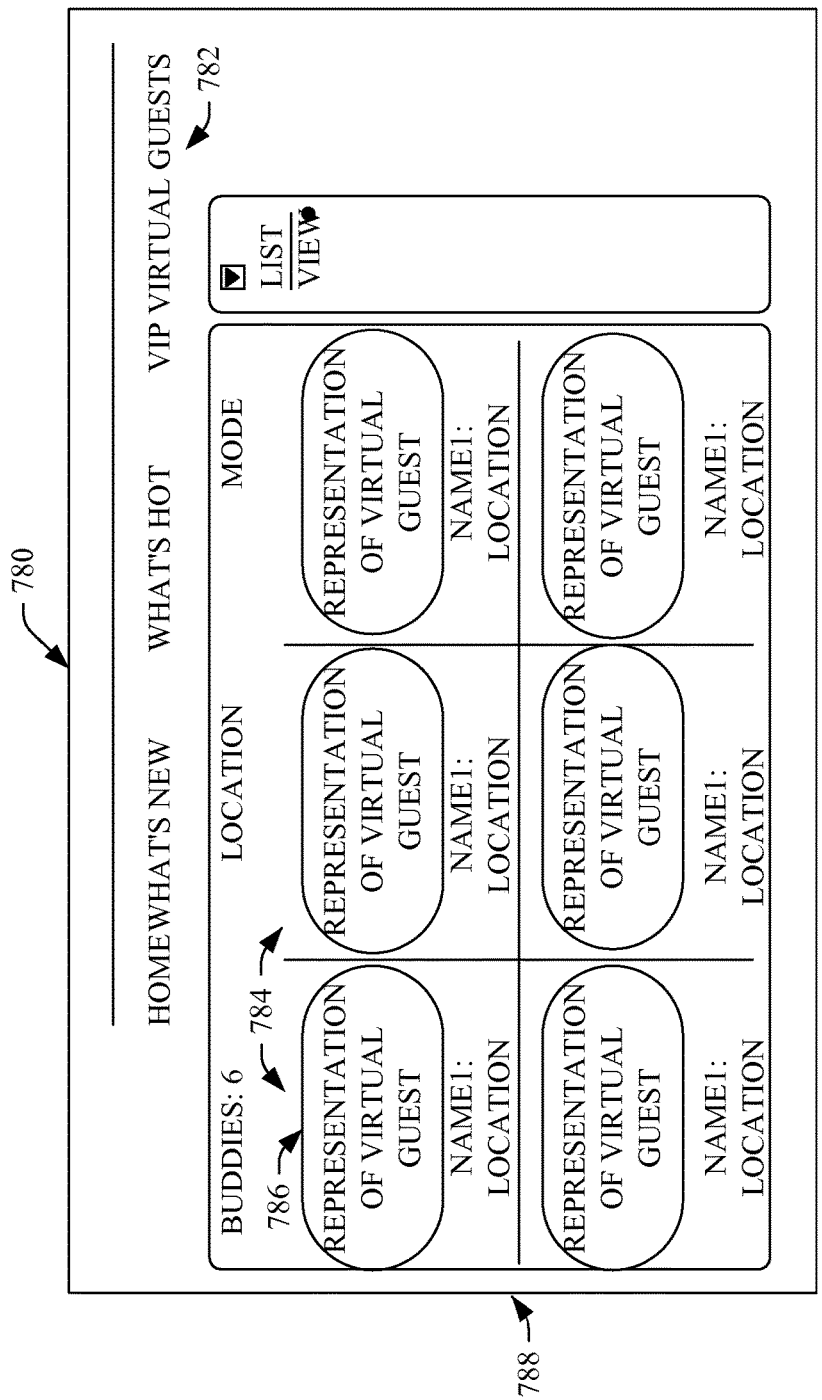
FIG. 7 illustrates a particular graphical user interface that provides information about user(s) in accordance with an aspect of the subject innovation.

FIG. 7 illustrates a particular graphical user interface 780 that provides information about a user's associates (e.g., other users who are actually physically present) and/or virtual guests in accordance with an aspect of the subject innovation. The interface 780 can include selectable buttons or hypertext links 782, (e.g., HOME, WHAT'S NEW, WHAT'S HOT, and VIP Virtual Guests), such as described above with respect to FIG. 6. The interface 780 also can include user interface elements 784 for each virtual guest and/or user that interact during an event. For example, a user interface element 784 can include a representation interface element 786 of the respective associate. The representation element 786 can include a holographic, graphical and/or textual representation of the associate as well as provide a link to the location(s) (e.g., URL(s)) where the virtual guest is located. The interface elements 784 also include a location interface element 788 corresponding to the location of the virtual guests. The location interface element 788 can identify which event the virtual guest is a spectator of as well as provide a link to the spectator experience (and location therein) where that guest is located. Thus, by activating or selecting one of the interface elements 786, 788, a user can access the spectator experience in which the virtual guest already is invited.

Figure 8:
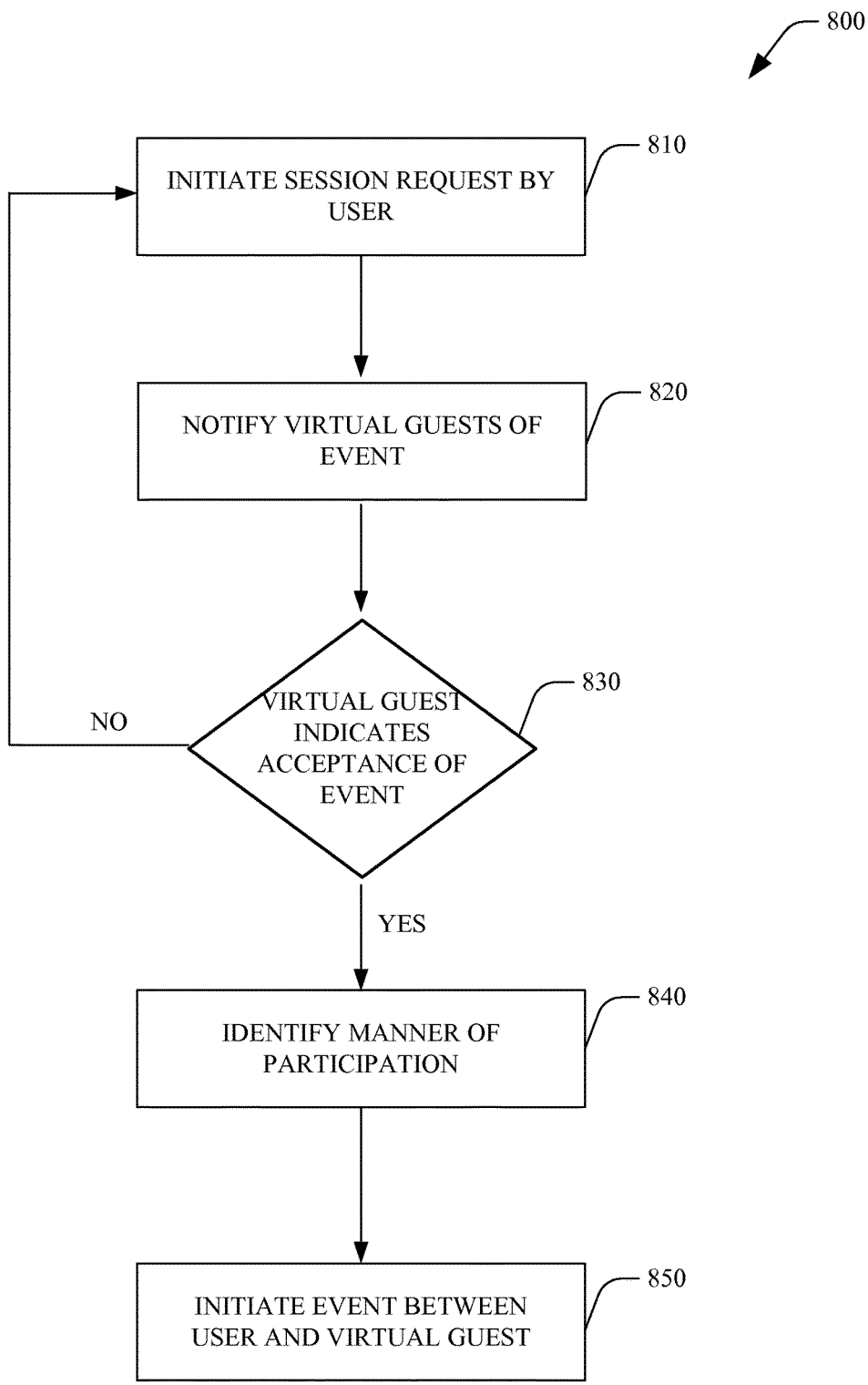
FIG. 8 illustrates a particular methodology of concurrently experiencing an event by users and virtual guests in accordance with an aspect of the subject innovation.

FIG. 8 illustrates a particular methodology of concurrently experiencing an event by users and virtual guest in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. A user who wishes to concurrently experience entertainment with a plurality of guests, initially can initiate a session request and at 810. Next, and at 820 guests can be notified of such event (e.g., via a mailing list, predetermined order and the like.) Subsequently, guests who are interested in virtually participating in such session can indicate their acceptance to the user at 830. Next and upon acceptance at 840, a desired form of participation (e.g., audio conferencing, video conferencing, chat room computer icons that identify a user, holographic representation of a guest, and the like) can be identified by the user/virtual guest. At 850 an event between user and virtual guest can be initiated, wherein the user feels presence of virtual guests (e.g., simulate presence of the guest in an environment of the user during performance of the event.

Figure 9:
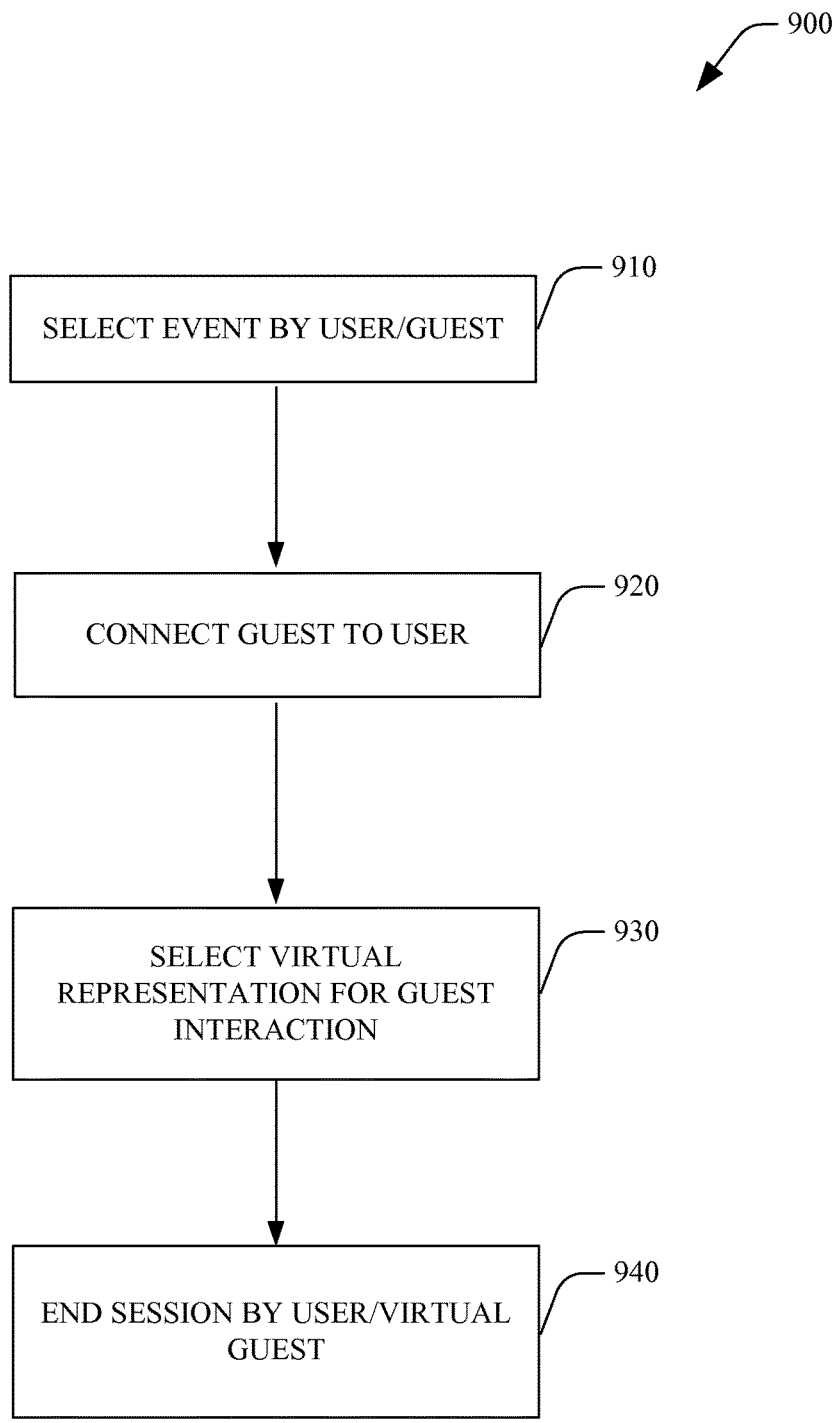
FIG. 9 illustrates a particular methodology of user/virtual guest interaction, according to an exemplary aspect of the subject innovation.

FIG. 9 illustrates a particular methodology in accordance with an aspect of the subject innovation. Initially and at 910 an event can be selected by users(s)/guest, to be enjoyed simultaneously. Next, and at 920 the guest can be connected to the users in form of a virtual representation via a virtual reality generation component, as described in detail supra. Subsequently, and at 930 a virtual representation for guest interaction can be selected, e.g., holographic representation, avatar, and the like. Users(s) and virtual guests can interact therebetween, and although guests are only present virtually (e.g., electronically present with other objects/user within the environment) such virtual invitation enables a user and guests to concurrently experience the entertainment together (e.g., a live sporting event, spectator game)—so that the user actually senses (e.g. feels) presence of the virtual guest (e.g., oral real-time communication, visual real time exchange between virtual guest and user, and the like). Upon request by user/virtual guest or end of event, virtual guest can end or exit the session at 940.

Figure 10:
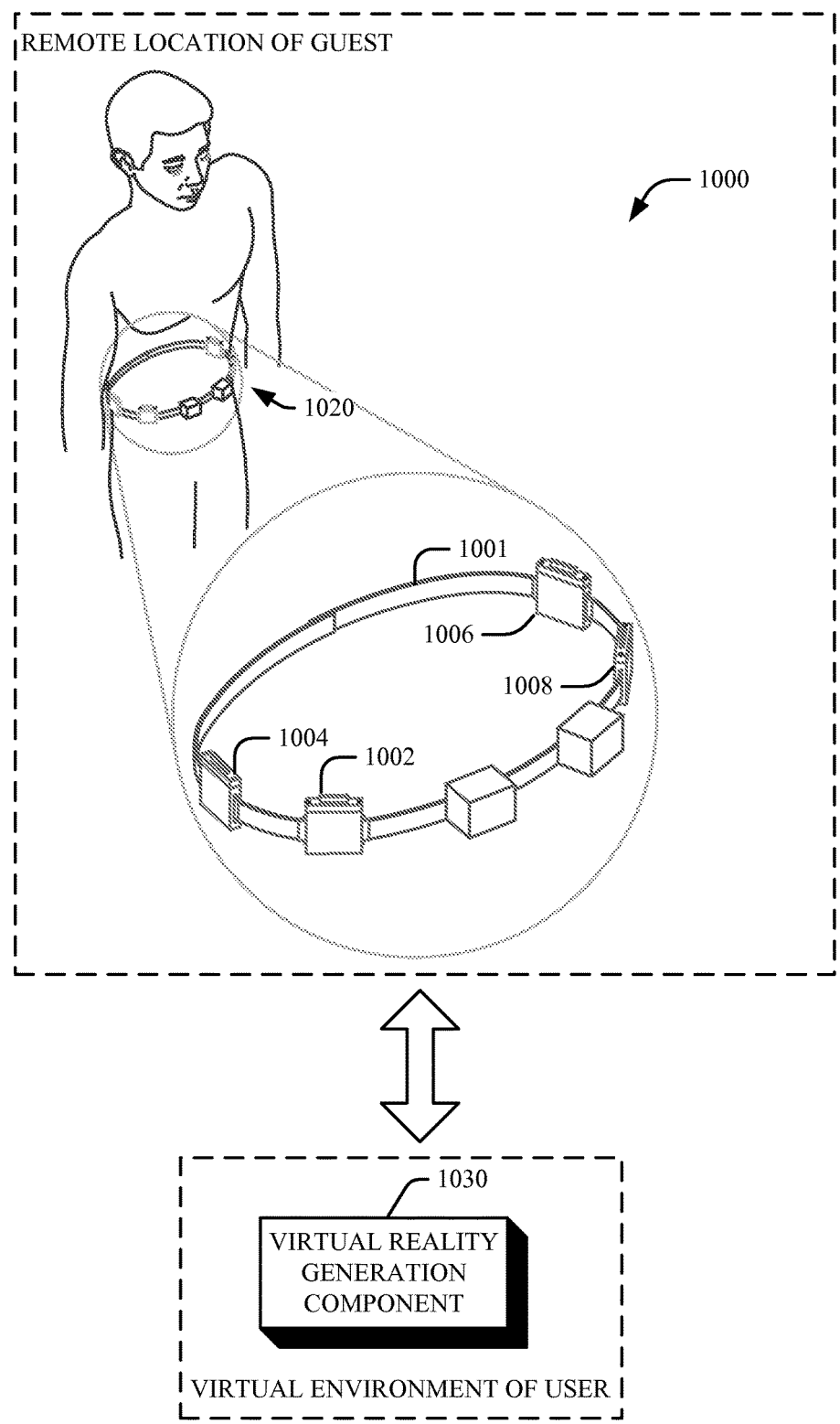
FIG. 10 illustrates a spatial distribution of modular components around a guest, to track bodily movements for mimicking by an avatar/holograph.

FIG. 10 illustrates a system of tracking body movements for a guest in a remote location, to gather data for mimicking virtual representation of such guest's performance in real time to a user, or any desired object as determined by the virtual reality generation component. Typically, from remote locations guests who have accepted the virtual invitation can wear the system 1000, and can control their virtual presence thru avatars that represent them, (e.g., data generated from electronic and electromagnetic tracking components 1002, 1004, 1006 and 1008 can monitor bodily movement at remote guest location, and transfer such movements to a respective avatar and/or holographic virtual guest representation, at user location.) Such electromagnetic tracking components are in communication with a plurality of movement indicating sensors (not shown), which are secured at a number of predetermined positions to determine movements of the guest who wears the belt 1001. Typically, any movement by the guest wearer, including wrist, arm, and foot movements, generates data indicative of the movement and controls an object in the virtual reality generation component 1030.

It is to be appreciated that various tracking components for a distributed control system 1000 can be spatially distributed along a common communication link, (e.g., such as a belt 1001 around a user's body as illustrated in FIG. 10.) Data can be communicated with such components 1002-1008 over a common communication link, or network, wherein all modules on the network communicate via a standard communications protocol.

Such collected data can be transmitted to the virtual reality generation component for processing in real time. The movement indicating data can be continuously processed within a virtual reality program, which is associated with the virtual reality generation component 1030. Accordingly, an object such as an avatar that represents the guest in virtual form (virtual guest) in the user setting has movements that substantially mimic the movements of the guest wearer. Moreover, bend sensors and pressure sensors can also be employed and connected to data collecting components 1002-1008. For example, the data collecting components 1002-1008 receive signals generated by a bend sensor(s) or pressure sensors, and processes the signals for transmitting movement indicating data to a recipient computer. The data collection unit can also include a low-pass filter (not shown) for removing noise in the signals received from the sensors.

An analog-to-digital signal converter (not shown) can also be provided for obtaining a representative data value for each of the signals generated by the bend and pressure sensors. After conversion, gathered data can be further normalized to provide signals indicating actual movement of the articulations of the guest wearer and to calibrate the sensors to accommodate for varying ranges of motion, for example. The normalized data can then be transmitted to the virtual reality generation component 1030 (e.g., associated with the virtual reality system and/or presentation engine) to implement holographic avatars, for example. Moreover, various health indicia (such as blood pressure, heart rate, and the like) of the guests can be monitored, and presented to a user, to enhance level of interaction between users and virtual guests—e.g., to signify excitement.

Figure 11:
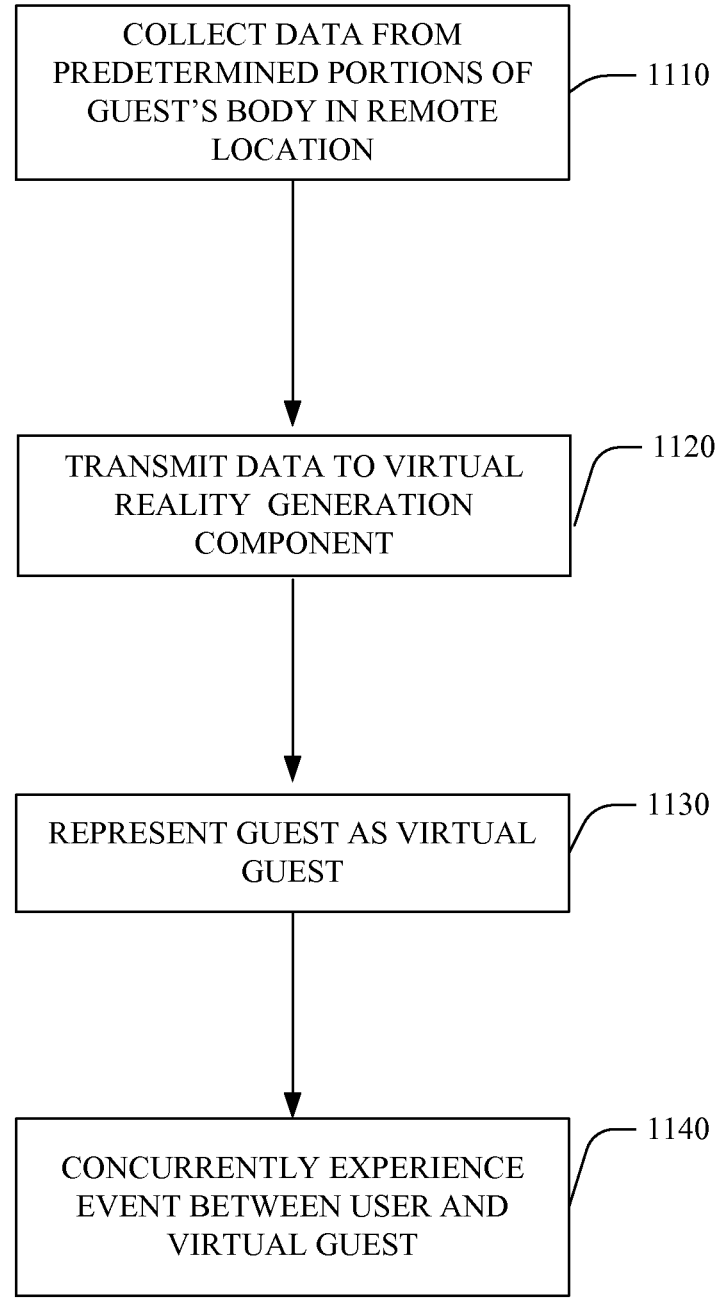
FIG. 11 illustrates a related methodology of mimicking a guest interaction as a virtual guest.

FIG. 11 illustrates a related methodology of data collection and transfer to an avatar that represents a virtual guest in accordance with an aspect of the subject innovation. Initially, and at 1110 data can be collected from predetermined locations on a body of the guest who has accepted a virtual invitation from a user. Next, and at 1120, the collected data can be forwarded to the virtual reality generation component. For example, the data from the data collection unit can be fed into a computer associated with the virtual reality generation component for processing, while the position and orientation data is also processed. The data is processed and fed in real time to control a program, such as a virtual reality program, running on such virtual reality generation component. Thus, the plurality of movement indicating sensors can generate and transmit data indicative of any movements of the guest. Movements by the guest in a remote location, including wrist, arm, and foot movements are transmitted to a computer associated with the virtual system for processing and generation of virtual guest. The movement indicating data is continuously processed so that an object, such as a character in a virtual reality program running on the computer, has corresponding real time movements analogous to the movements of the corresponding guest in a remote location.

Such virtual reality generation component can supply a graphic, scent and/or audio; wherein interconnected computers, video and audio processing devices, supply a live interaction between a user and a guest(s). Next, and at 1130, guests can be represented virtually (e.g., electronically present with other objects/user within the environment). At 1140, the virtual invitation arrangement of the subject innovation enables a user and guests to concurrently experience the entertainment together (e.g., a live sporting event, spectator game), wherein the user can feel actual presence of guest(s) in same environment (e.g., full duplex communication while experiencing the event, odor, visual prompts exchange with virtual guest, data exchange and the like.)

Figure 12:
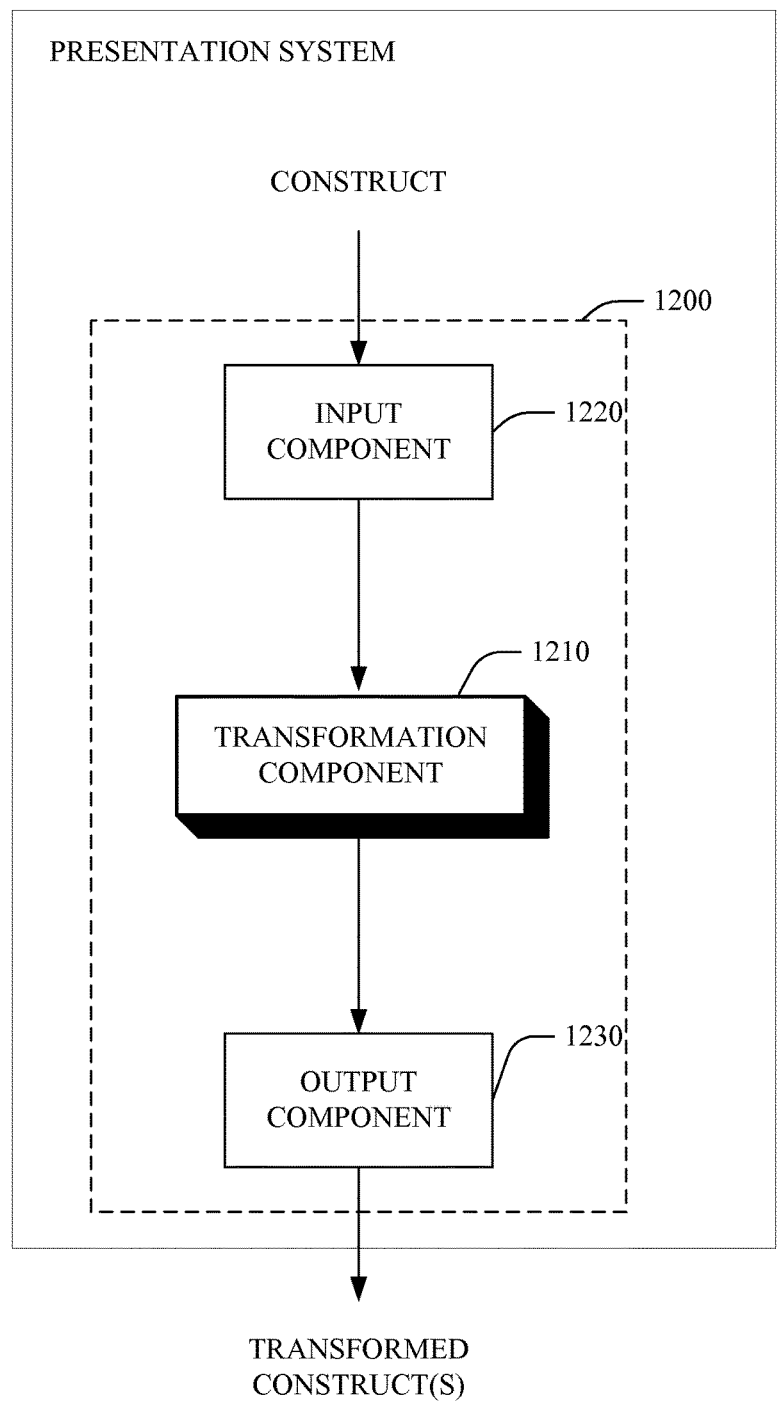
FIG. 12 illustrates a system with a transformation component that employs transformation functions to enable creation of a variety of scenarios, according to an aspect of the subject innovation.

FIG. 12 illustrates a system 1200 with a transformation component that employs transformation functions to enable creation of a variety of scenarios (e.g. change of avatar representation, appearance of the virtual guest, transform of activities performed by the guests and the like), according to an aspect of the subject innovation. The transformation component 1200 can transform one construct, such as an avatar to another construct. The system 1200 further comprises an input component 1220 that receives constructs and conveys received constructs to the transformation component 1210 and an output component 1230 that receives and outputs transformed constructs.

The transformation component 1210 can transform essentially any construct (e.g., structured data) from one structure to at least one different structure. When transforming the construct to more than one other construct, the construct can be concurrently transformed into disparate constructs and output via the output component 1230. For example, an object construct can be received by the input component 1220 and conveyed to the transformation component 1210, wherein the object construct can be mapped to a schema construct, a relational construct and/or a user interface (UI) construct, disparate schema constructs, disparate relational constructs, disparate UI constructs, and/or other constructs. Generated constructs can be conveyed to the output component 1230. It is to be appreciated that other transformations are well within the realm of the subject innovation, and the subject innovation is not so limited. For example, object, object instance, UI, relational tables, schema, etc. constructs can be transformed to and from one another, including disparate forms of the same construct (e.g., from one object construct to another object construct).

In many instances, an iterative approach can be employed, wherein a resultant construct can be cycled through the transformation component 1210 multiple times until the desired construct is generated. For example, a first construct can be conveyed to the transformation component 1210 by the input component 1220, wherein the mapping component 1210 transforms the first construct to a second construct. The second construct can be cycled back to the transformation component 1210 and transformed to a third construct. The cycle can continue until a desired construct is generated, wherein any intermediate construct as well as the desired construct can be serially and/or concurrently output by the output component 1230.

The transformation component 1210 can introduce and/or suppress entities within a construct's structure to facilitate construct transformation. For example, a first construct can include indicia that is not utilized in a second construct. For example, such indicia can be suppressed and/or modified by the mapping component 1210 before, during and/or after transforming to the second construct. In addition, such information, although suppressed in the second construct, can be hidden, but retained such that if the second construct is transformed back to the first construct, the original information can be preserved or if the second construct is transformed to a third construct, the original information can be suitably utilized (e.g., hidden, modified and visible).

In a related example, the first construct can exclude indicia required in the second construct. In these instances, such indicia can be introduced by the transformation component 1210 before, during and/or after transforming the construct. Similar to suppressed indicia, introduced indicia can be identified from original structure. Thus, introduced indicia can be removed in order to preserve the original information and/or modified to comply with another construct.

The input component 1220 and the output component 1230 can further include suitable interfaces to interact with the transformation component 1210. For example, the input component 1220 and the output component 1230 can be application program interfaces (API's), software drivers, communication protocols, routines, network interfaces, and/or bus interfaces. In addition, the input component 1220 and output component 1230 can be concurrently interfaced to disparate entities, wherein transformation of multiple constructs from multiple entities can be performed in parallel. Hence, activities of guests can be modified (e.g., exaggerated, suppressed, avatar appearances changed, and the like.)

As used in herein, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 13:
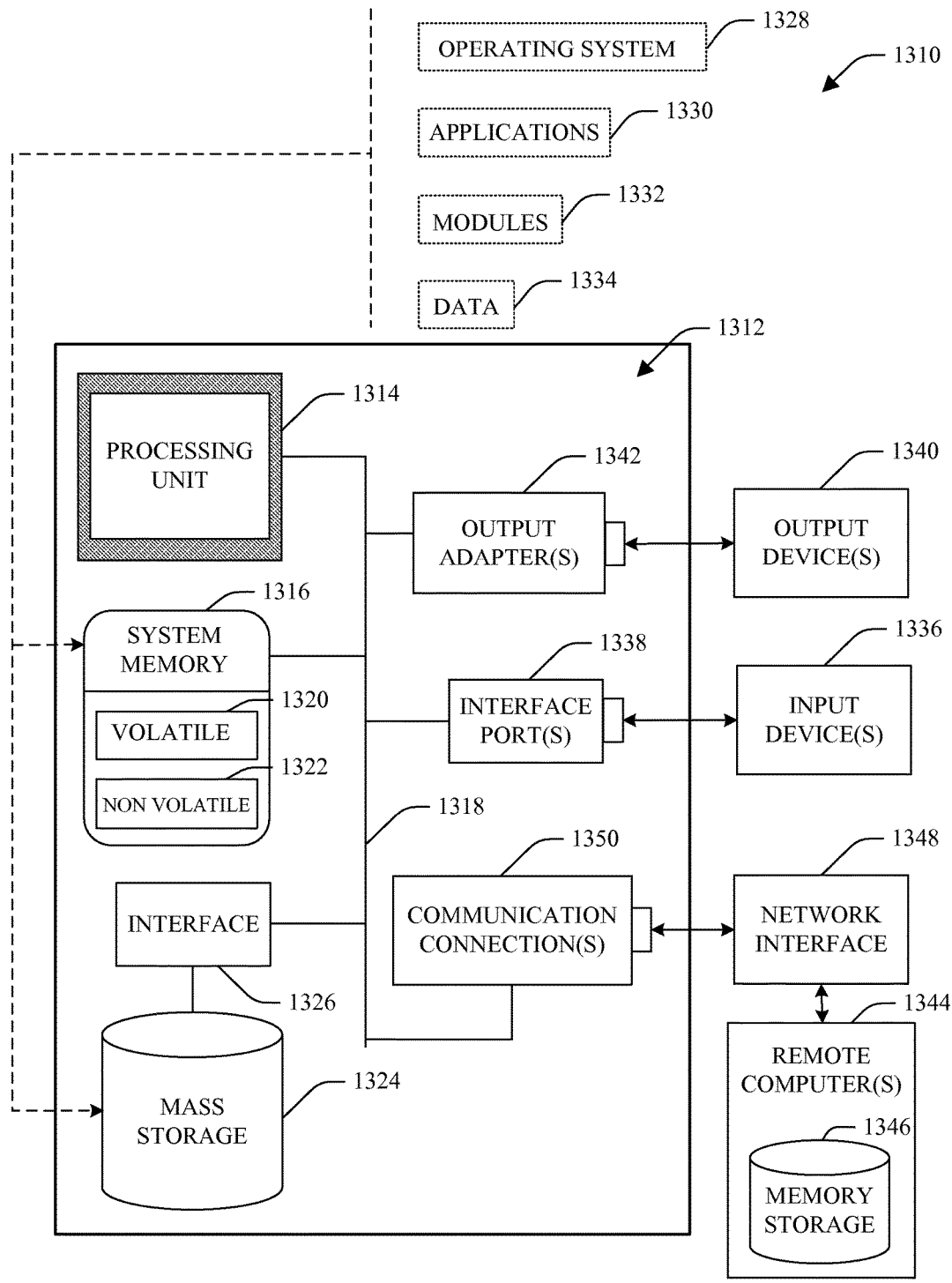
FIG. 13 illustrates an exemplary operating environment for implementing various aspects of the subject innovation.
Figure 14:
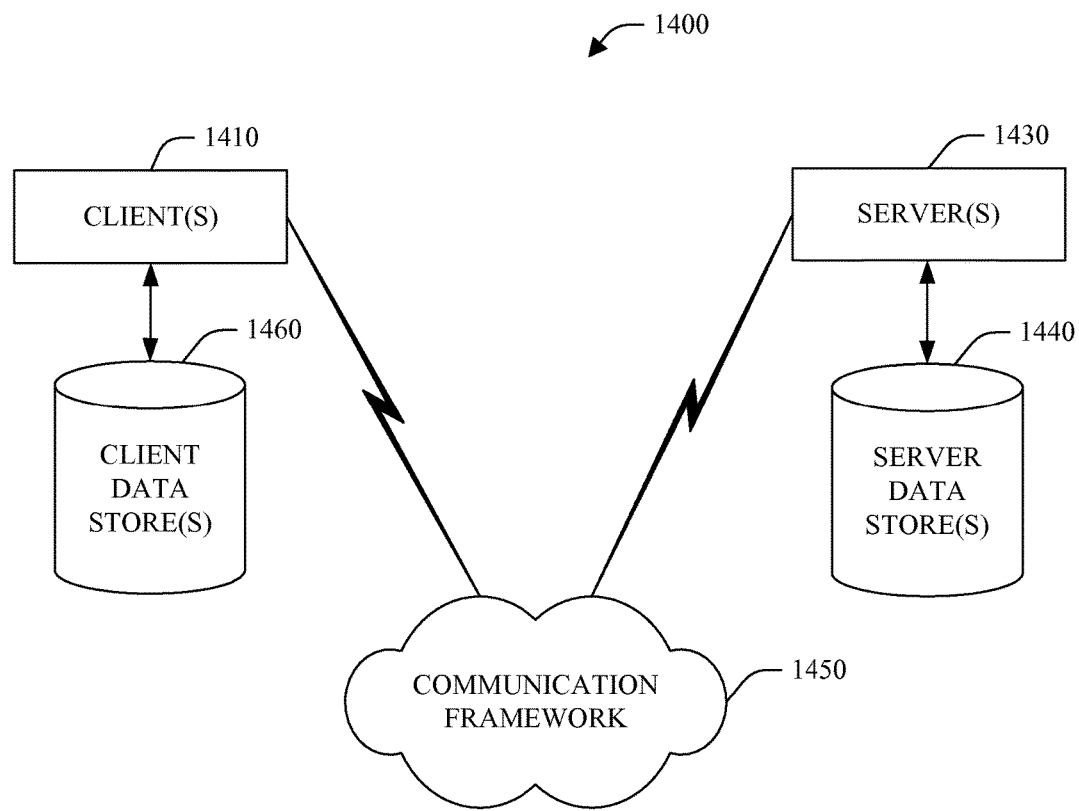
FIG. 14 is a schematic block diagram of a sample-computing environment with which the subject innovation can interact

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, an exemplary environment 1310 for implementing various aspects of the subject innovation includes a computer 1312 (e.g., desktop, laptop, server, hand held, programmable consumer or industrial electronics . . . ). The computer 1312 includes a processing unit 1314, a system memory 1316, and a system bus 1318. The system bus 1318 couples system components including, but not limited to, the system memory 1316 to the processing unit 1314. The processing unit 1314 can be any of various available microprocessors. Dual microprocessors and other multiprocessor architectures (e.g., multi-core) also can be employed as the processing unit 1314.

The system bus 1318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory.

Computer 1312 also includes removable/non-removable, volatile/non-volatile computer storage media. FIG. 13 illustrates, for example, mass or auxiliary storage 1324. Mass storage 1324 includes, but is not limited to, devices like a magnetic disk drive, floppy disk drive, tape drive, Jaz drive, Zip drive, LS-100 drive, flash memory card, or memory stick. In addition, mass storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on mass storage 1324 and loaded to system memory 1316, acts to control and allocate resources of the system 1312. System applications 1330 take advantage of the management of resources by operating system 1328 through program modules 1332 and program data 1334 stored either in system memory 1316 or on mass storage 1324. It is to be appreciated that the subject innovation can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like displays (e.g., flat panel, CRT, LCD, plasma . . . ), speakers, and printers, among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected (e.g. wired or wirelessly) via communication connection 1350. Network interface 1348 encompasses communication networks such as local-area networks (LAN) and wide-area networks (WAN).

Communication connection(s) 1350 refers to the hardware/software employed to connect the network interface 1348 to the bus 1318. While communication connection 1350 is shown for illustrative clarity inside computer 1316, it can also be external to computer 1312. The hardware/software necessary for connection to the network interface 1348 includes, for exemplary purposes only, internal and external technologies such as, modems including regular telephone grade modems, cable modems, power modems and DSL modems, ISDN adapters, and Ethernet cards or components.

FIG. 14 is a schematic block diagram of a sample-computing environment 1400 with which the subject innovation can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing the subject innovation, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1460 that can be employed to store information local to the client(s) 1410. Similarly, the server(s) 1430 are operatively connected to one or more server data store(s) 1440 that can be employed to store information local to the servers 1430. For example, the virtual reality component can be associated with server(s) 1430. This web service server can also be communicatively coupled with a plurality of other servers 1430, as well as associated data stores 1440, such that it can function as a proxy for the client 1410.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer implemented system comprising:
   at least one processor;
   a memory that includes components that are executable by the at least one processor, the components comprising:
   a virtual reality generation component that converts a real-life bodily movement of a guest into a corresponding virtual bodily movement of a virtual guest representation three-dimensional projection in a real-life environment of a user during an event to at least the user by a three dimensional projection unit;
   a presentation component that obtains state information regarding the guest, the state information defining a status and a relationship of the guest and the at least one user relative to the real-life environment and the performance of the event and presents the virtual bodily movement of the virtual guest representation to the at least one user, the virtual guest representation being rendered based at least on the state information; and
   a background isolation component that filters, according to a user selection, light associated with a background of the real-life environment of the at least one user relative to the event.

2. The computer implemented system of claim 1, further comprising an electromagnetic tracking device that monitors a pressure sensor or a bend sensor that is activated by the real-life bodily movement of the guest.

3. The computer implemented system of claim 1, further comprising a graphical user interface component that provides a portal for accessing spectator related services associated with the virtual guest representation of the guest to the at least one user.

4. The computer implemented system of claim 1, further comprising a graphical user interface component that controls interaction of the at least one user with the virtual representation of the guest during the event.

5. The computer implemented system of claim 4, further comprising a viewing control component that enhances spectator data related to the interaction of the virtual guest representation and the at least one user.

6. The computer implemented system of claim 4, further comprising an artificial intelligence component that facilitates the interaction between the at least one user and the virtual guest representation.

7. The computer implemented system of claim 1, wherein the virtual reality generation component further comprising an aggregator component that combines data associated with a plurality of guests.

8. The computer implemented system of claim 1, further comprising a transformation component to transform the virtual guest representation.

9. The computer implemented system of claim 8, wherein the transformation component transforms the virtual guest representation in form of an avatar of the guest into another avatar.

10. The computer implemented system of claim 9, wherein the avatar comprises constructs that are transformed from one form to another form.

11. The computer implemented system of claim 9, wherein the presentation component presents the transformed virtual guest representation to the at least one user.

12. The computer implemented system of claim 9, wherein the avatar is a holographic avatar that represents the guest.

13. The computer implemented system of claim 12, wherein the three dimensional projection unit presents the avatar to the user.

14. A computer implemented method comprising the following computer executable acts:
   inviting a guest to virtually attend an event that is being attended in-person by an actual user, the guest being represented by a virtual guest representation that is projected in an environment of the user by a three dimensional projection unit;
   converting a real-life bodily movement of the guest into a corresponding virtual bodily movement of the virtual guest representation in the environment for presentation to the actual user;
   obtaining object information regarding the interaction of the virtual guest representation, the actual user, and the event;
   obtaining state information regarding the guest, the state information defines a relationship of the guest and the actual user relative to the event;
   presenting the virtual bodily movement of the virtual guest representation to the actual user, the virtual guest representation being rendered based at least on the object information and the state information; and
   filtering, according to a user selection, light associated with a background of the real-life environment of the actual user relative to the event.

15. The computer implemented method of claim 14, wherein the virtual bodily movement of the virtual guest representation simulates a presence of the guest to the actual user during performance of the event.

16. The computer implemented method of claim 14, further comprising:
   obtaining additional state information regarding an additional guest attending the event that is represented by an additional virtual guest representation; and
   blocking the additional virtual guest representation from being viewed by the actual user based on the additional state information of the additional guest.

17. The computer implemented method of claim 16, wherein the virtual guest representation is a holographic avatar of the guest.

18. The computer implemented method of claim 17, further comprising transforming the holographic avatar into another holographic avatar.

19. A computer implemented method comprising:
   inviting a guest to virtually attend an event that is being attended in-person by the user, the guest being represented by a virtual guest representation that is projected in an environment of the user by a three dimensional projection unit;
   converting real-life bodily movements of the guest into corresponding virtual bodily movements of the virtual guest representation in the virtual environment for presentation to a user;
   obtaining state information regarding the guest, the state information defines a relationship of the guest and the user;
   monitoring one or more health indicia of the guest that includes at least one of a blood pressure or a heart rate of the guest;

filtering, according to a user selection, light associated with a background of the environment of the user relative to the event;
presenting the virtual guest representation having the one or more health indicia of the guest, the virtual guest representation being rendered based at least on the state information; and
updating the state information continually as a function of time, or in response to an instruction received from the user.

20. The computer implemented method of claim 19, wherein the state information regarding the guest includes an indication that the user and the guest admire a same entity.

* * * * *